United States Patent [19]

Beckhausen

[11] Patent Number: 5,023,418

[45] Date of Patent: Jun. 11, 1991

[54] SAFETY EDGE SWITCH

[76] Inventor: Karlheinz Beckhausen, Konradstrasse 15, D-5000 Cologne 41, Fed. Rep. of Germany

[21] Appl. No.: 445,762

[22] Filed: Dec. 4, 1989

[51] Int. Cl.$^5$ .............................................. H01H 1/06
[52] U.S. Cl. ........................................ 200/511; 49/26; 187/DIG. 1; 200/61.43
[58] Field of Search ...................... 200/511, 264, 61.1, 200/61.11, 61.41–61.44; 49/26, 27; 187/56, 104, DIG. 1

[56] References Cited

FOREIGN PATENT DOCUMENTS 2643505 3/1978 Fed. Rep. of Germany ... 200/61.43
3304400 5/1988 Fed. Rep. of Germany .

Primary Examiner—Renee S. Luebke
Attorney, Agent, or Firm—Charles L. Schwab

[57] ABSTRACT

A safety edge switch for power-actuated devices such as roller gates, roller grilles, etc., and lifting platforms, working platforms and the like, as well as for the guarding of machines or spaces, for example as safety flooring, with a hollow rubber profile (1) within which there is a knife-edge rib (5), the surface of the rib and the opposing surface of the hollow rubber profile being made electrically conductive and the mutual contact of the surfaces leading to a switching pulse. The requisite conductivity of the hollow rubber profile is achieved by virtue of the fact that the rib (5) and the main part of the hollow rubber profile (1) are made wholly electrically conductive, the conductivity arising through the admixture of conductive substances such as carbon black, graphite, metal powder and the like. The rib and the main part of the hollow rubber profile are insulated from each other by virtue of the fact that ordinary nonconductive rubber is present between these parts. The conductivity in the rib of the main part of the hollow rubber profile (1) can be enhanced by means of electrically conductive wires (6) of metal, carbon fibers or graphite fibers and the like.

17 Claims, 5 Drawing Sheets

SAFETY EDGE SWITCH

TECHNICAL FIELD

This invention relates to a safety edge switch for power-actuated devices such as roller gates, roller grilles, etc., and lifting platforms, working platforms and the like, as well as for the guarding of machines or spaces, for example as safety flooring, with a hollow rubber profile within which there is a knife-edge rib, the surface of the rib and the opposing surface of the hollow rubber profile being made electrically conductive and the mutual contact of the surfaces leading to a switching pulse.

PRIOR ART STATEMENT

A safety edge switch of the type cited or a corresponding hollow rubber profile, as well as the associated circuit, is known by way of German (Federal Republic) patent document DE 33 04 400 A1. The fundamental design of the safety edge switch or of the hollow rubber profile has proved suitable. It has turned out, however, that the electrically conductive surface on the rib or on the opposing surface of the hollow rubber profile could not be reproducibly fabricated, especially not in the mass production of the hollow rubber profile, in relation to which it is unavoidable that bending or kinking of the hollow rubber profile occurs in transport, processing and the like. It has also been seen that tearing of the surface and even of the rib or the opposing surface itself occured when the hollow rubber profile was pulled into the mounting of the safety edge switch. Further more, there is a need to lay stranded switching cables and the like along the hollow rubber profile.

OBJECTS AND BRIEF SUMMARY OF THE INVENTION

It is a primary object of the present invention to remedy the disadvantages and problems cited and, with simple means, to make available a safety edge switch of a hollow rubber profile that is practical in installation, can be manufactured at a favorable cost, and furthermore also permits severe bending without impairment of the conductivity for the generation of electric switching pulses. The essential part of the object is achieved by virtue of the fact that the rib and the major part of the hollow rubber profile are made wholly electrically conductive, the conductivity arising through the admixture of conductive substances such as carbon black, graphite, metal powder and the like. In this way, an adequate conductive cross section is made available in the conductive regions of the hollow rubber profile so that even unanticipated kinking with tears in the surface does not lead to a marked impairment of conductivity. Furthermore, a wholly conductive wall or rib can be manufactured at a more favorable cost and in a functionally more reliable manner so that an overall simplification, improvement, and reduction in cost of the hollow rubber profile is achieved.

Since it is a particular concern that the rib and the remaining portion of the hollow rubber profile coming in contact with the rib exhibit good electric conductivity, it is sufficient if these parts are fabricated from electrically conductive material. This has the advantage that the mounting strip with the undercut grooves, with which the hollow rubber profile is inserted in a mounting of the safety edge switch, may be electrically non-conductive, thus avoiding electrical transmission to the safety edge switch.

Since the mounting strip in this embodiment of the invention is not conductive, conductive wires or cables can be arranged along it, which wired or cable can be inserted without insulation so as to be available as signal lines and the like. Furthermore, the strength of the hollow rubber profile or of the mounting strip is enhanced by the inserted wires.

In another embodiment of the invention, the rib mounting base of the hollow rubber profile may be electrically nonconductive and the remainder of the hollow rubber profile may be made of electrically conductive material. Wires, cables and the like in the mounting strip must then be insulated if, in addition to mechanical strength enhancement, they are also the convey electrical signals, which use requires that no electrical connection arises between the wires, cables and the like.

In a further embodiment of the invention, it is proposed that electrically conductive wires or cables of metal, carbon fibers or graphite fibers and the like be arranged in the interior of the rib or of the conductive region of the hollow rubber profile and/or in or on its surfaces along the rib or along the conductive region of the hollow rubber profile. These wires or cables likewise serve, on the one hand, to increase the tensile strength of the rib or of the whole hollow rubber profile, and on the other hand to improve the conductivity within or on the surface of the rib or of the conductive region of the hollow rubber profile. It is thus insured that even severe kinking of the hollow rubber profile does not lead to marked impairment of the electric conductivity of the rib or of the conductive region of the hollow profile. If the electrically conductive wires and the like are made as resistance wires, the resistance in the rib or in the conductive region of the hollow rubber profile varies along the hollow rubber profile. If the rib now comes to rest on the opposing surface, then in addition to the switching pulse it can also be ascertained where, in terms of position, the contact has occured, since this can be determined from the resistance value present. The wires can also be made as heating wires. This has the advantage that the hollow rubber profile can also be employed in cold areas, cold changers and so forth without this region freezing or freezing up.

In a further embodiment of the invention, it is proposed that a further groove be made within the lateral undercut grooves, which further groove is adjacent to the mounting strip. It is thus possible to push or lead the hollow rubber profile into various mountings so that the range of application of the hollow rubber profile is enhanced.

In a further embodiment of the hollow rubber profile, it is proposed that grooves, preferably with a dovetail or circular cross section, be made along the profile in the external surface of the hollow rubber profile near the mounting strip. Additional sealing strips or sealing profiles extending beyond the hollow rubber profile can be inserted in these grooves. This is especially advantageous or important when safety edge switches come in contact with uneven mating surfaces and are also to perform a sealing function in addition to their safety function. The additional sealing strips or sealing profiles extend beyond the hollow rubber profile and thereby fill in irregularities and the like. Wires, cables and the like that are advantageous for the operation of the equipment can, however, also be placed in these grooves. For example, the return conductor from one end of the edge switch to the other end can be placed therein. Depending on the size of the cable, said cable can also be fastened in the groove by means of projections or strips or by means of clips.

It has further been seen that a hollow rubber profile in accordance with the invention can be mounted in various patterns on the bottom of arbitrary surfaces, so that a spiral, snaking or zigzag arrangement of the hollow rubber profile is obtained. Such a surface can be placed in or on the floor in the region of machines, spaces and so forth to be guarded so that safety floorings are thus obtained. Arbitrary switching functions can be executed when these flooring surfaces are stepped on. It is also possible to form the hollow rubber profiles in stripe form on the bottom of surfaces, so that a large number of individual contact stripes is obtained.

BRIEF DESCRIPTION OF THE DRAWINGS

For a further explanation of the invention, reference is made to the drawings, which illustrate several sample embodiments of the invention in simplified form. All the figures show cross sections through hollow profiles in accordance with the invention.

DETAILED DESCRIPTION OF THE INVENTION

Figure 1:
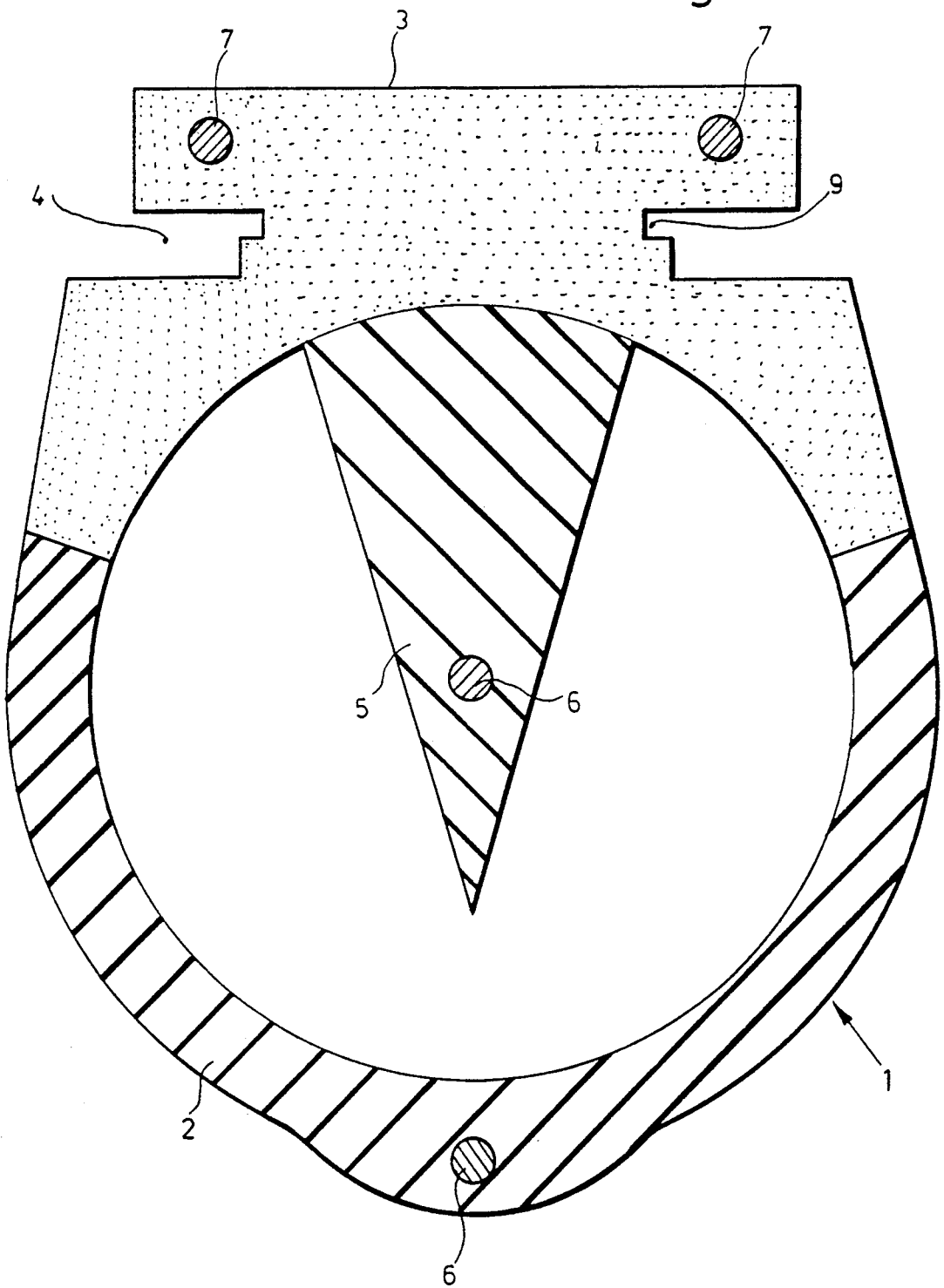
FIG. 1 shows a hollow rubber profile in which the rib and the region of the hollow rubber profile that, during use, may come in contact with the rib are fabricated from electrically conductive material, the remainder of the hollow profile being nonconductive.

In FIGS. 1 to 4, insofar as shown individually, the numeral 1 generally denotes a hollow rubber profile which exhibits a tubular basic body 2, along which a mounting strip 3 is molded, with lateral undercut grooves 4 provided between the mounting strip 3 and the tubular basic body 2. A knife-edge rib 5 is molded inside the tubular basic body with its groove base adjacent to the mounting strip 3. The hatched surfaces of the hollow rubber profile are fabricated from electrically conductive material, while the dotted surfaces are fabricated from electrically nonconductive material.

As can further be seen from FIGS. 1 to 4, an electrically conductive wire or cable, denoted by the number 6, is arranged inside the knife-edge rib 5 and the conductive region of the hollow rubber profile or of the tubular basic body 2, which wire or cable is inserted without insulation, improves the conductivity and enhances the tensile strength.

As further can be seen from FIG. 1, signal lines 7 are arranged in the mounting strip 3, which signal lines are arranged without insulation since this region is likewise made nonconductive. They serve both for the conveyance of signals and also for enhancement of the tensile strength of the mounting strip 3.

Figure 2:
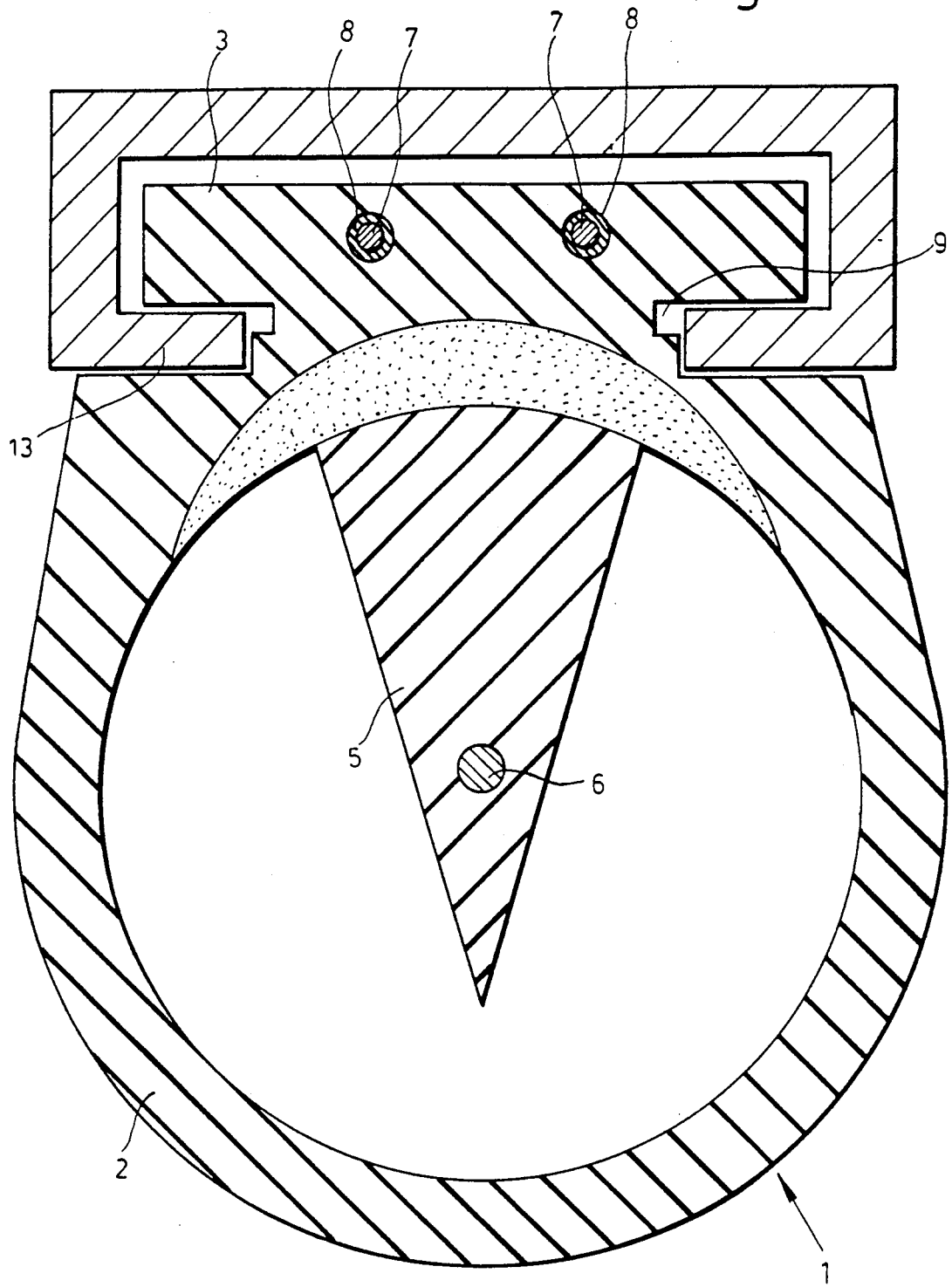
FIG. 2 shows a hollow rubber profile in which only the rib mounting base is made nonconductive, the entire remainder of the hollow rubber profile, in contrast, being made electrically conductive and the lateral undercut grooves being filled by large mountings.
Figure 3:
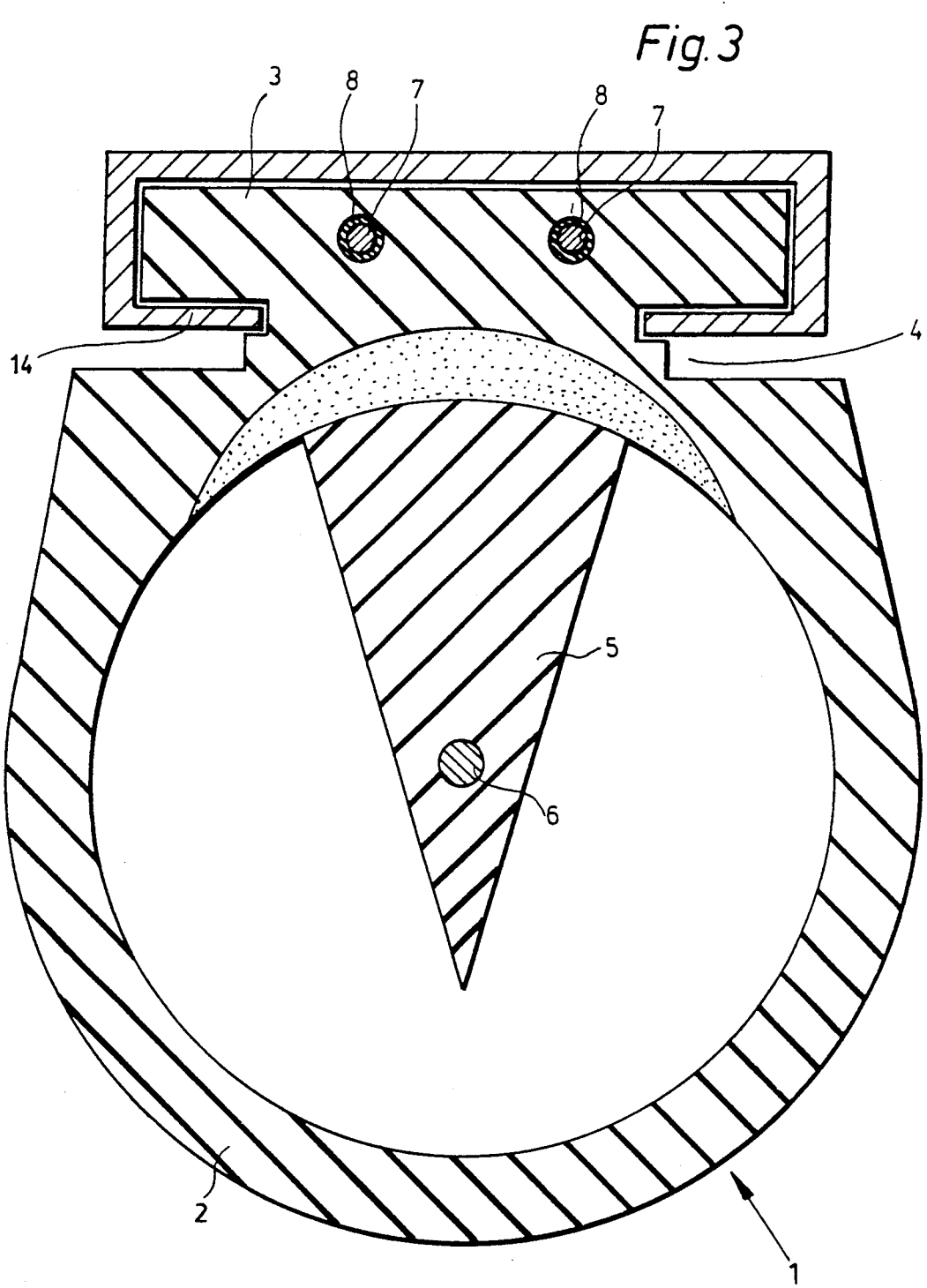
FIG. 3 shows a hollow rubber profile as in FIG. 2, in which small mountings engage in the further grooves made in the groove root of the undercut grooves.

In FIGS. 2 and 3, in contrast to FIG. 1, signal lines 7 are inserted in the mounting strip 3, which signal lines are provided with insulating sheaths 8 since the base material is made electrically conductive.

As can further be seen from FIGS. 2 and 3, the undercut grooves 4 or additional grooves 9 can optionally accommodate either a large mounting 13 or a small mounting 14.

Figure 4:
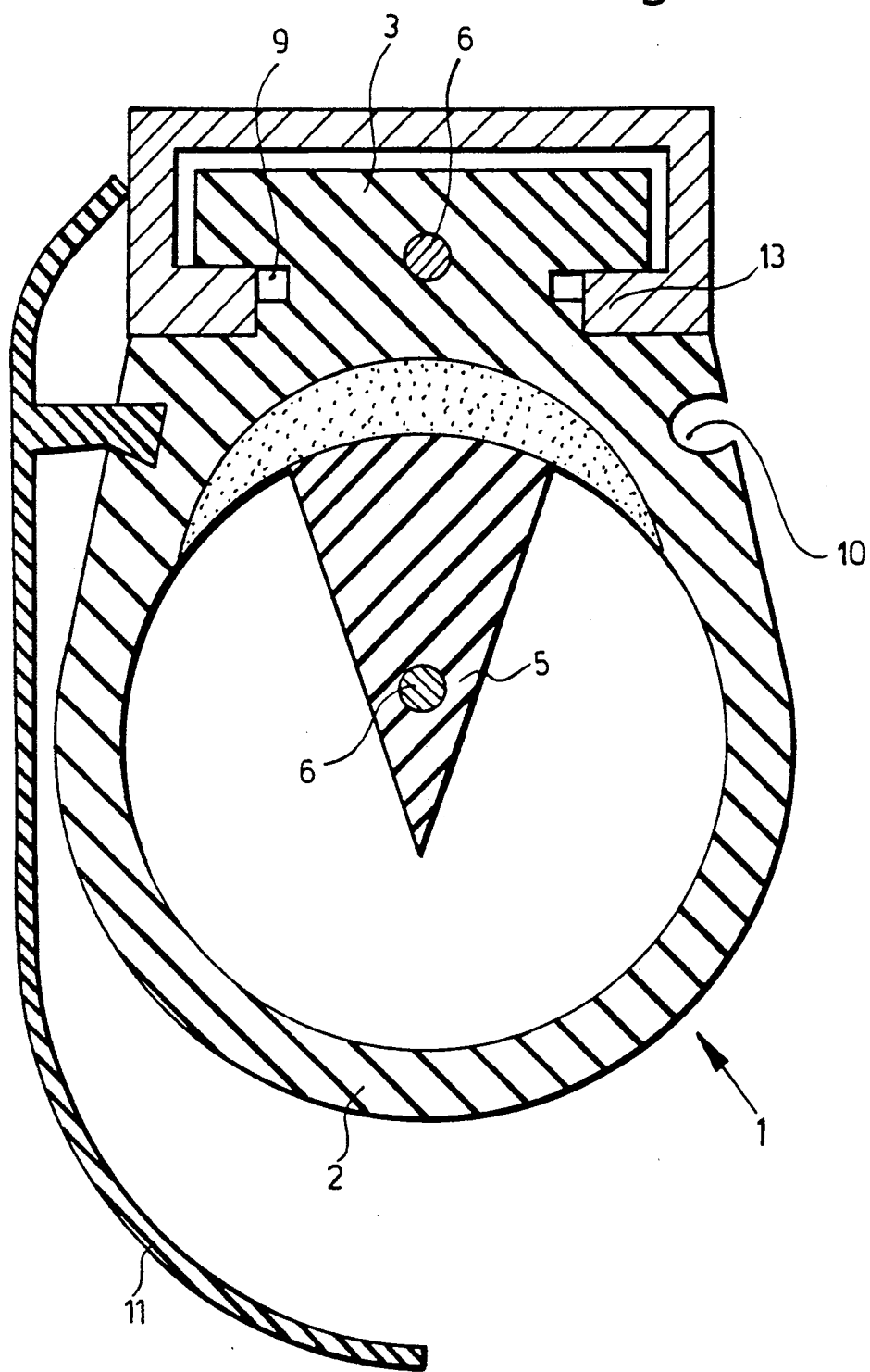
FIG. 4 shows a hollow rubber profile as in FIGS. 2 and 3, in which grooves are provided in the external surfaces of the hollow rubber profile with a sealing strip inserted in a groove on one side of the profile.
Figure 5:
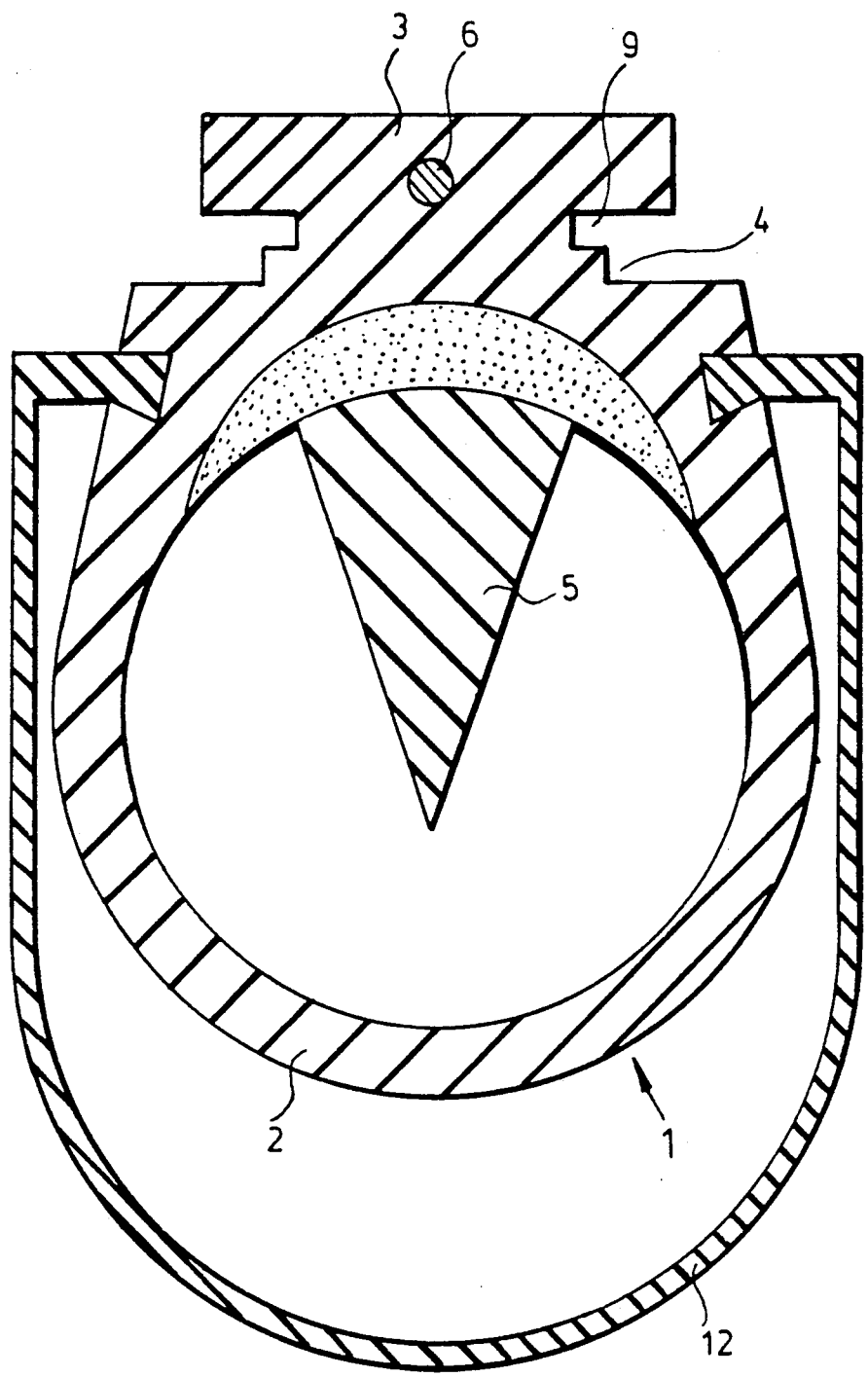
FIG. 5 shows a hollow rubber profile as in FIG. 4, in which a sealing profile completely extending beyond the hollow rubber profile is inserted in both grooves in the external surface of the hollow rubber profile.

The dovetail-shaped or circular grooves 10 made in FIGS. 4 and 5 can accommodate either a sealing strip 11 arranged on one side or a sealing profile 12 completely enclosing the hollow rubber profile. They can also accommodate wires, cables and the like.

The embodiments of the invention in which an exclusive property or privilege is claims are defined as follows:

1. A safety edge switch for power-actuated devices such as roller gates, comprising:
   a hollow rubber profile (1) including a tubular basic body part (2) with a hollow interior, a knife-edge rib part (5) within said interior, said rib part and said tubular basic body part presenting confronting contact surfaces which are electrically conductive and, when brought into contact, are operable to cause a switching pulse, said rib part (5) and said tubular basic body part (2) being rendered wholly electrically conductive by their being comprised of an admixture of conductive substances and an electrically conductive wire (6) disposed within one of said parts.

2. The safety edge switch of claim 1 wherein said electrically conductive wire (6) is a heating element.

3. The safety edge switch of claim 1 wherein said hollow rubber profile (1) includes a rib mounting base which is electrically nonconductive.

4. The safety edge switch of claim 1 wherein a mounting strip (3) with lateral undercut grooves (4) is molded onto the hollow rubber profile (1).

5. The safety edge switch of claim 1 wherein said one part is said rib part (5).

6. The safety edge switch of claim 1 wherein said one part is said tubular basic body part (2).

7. A safety edge switch for power-actuated devices such as roller gates, comprising:
   a hollow rubber profile (1) with a hollow interior, a knife-edge rib (5) within said interior, said rib and said hollow rubber profile presenting confronting contact surfaces which are electrically conductive and, when brought into contact, are operable to cause a switching pulse, said rib (5) and a main part of said hollow rubber profile (1) being rendered wholly electrically conductive by their being comprised of an admixture of conductive substances, a mounting strip (3) molded onto said hollow rubber profile (1) and an electrically conductive wire (7) disposed within said mounting strip (3).

8. The safety edge switch of claim 7 wherein said mounting strip (3) is electrically nonconductive and said wire is uninsulated.

9. The safety edge switch of claim 7 wherein said mounting strip is electrically conductive and said wire is insulated.

10. The safety edge switch of claim 7 and further comprising an electrically conductive wire (6) disposed in said rib (5).

11. The safety edge switch of claim 10 wherein said electrically conductive wire (6) is a heating element.

12. The safety edge switch of claim 7 wherein said mounting strip (3) includes lateral undercut grooves (4).

13. The safety edge switch of claim 12 wherein each of said undercut grooves has a root and further comprising a further groove (9) inside and at said root of each of said lateral undercut grooves (4) in adjacent relation to said mounting strip (3).

14. The safety edge switch of claim 12 and further comprising a groove (10) extending along said hollow rubber profile (1) in the external surface of said hollow rubber profile (1) near said mounting strip (3).

15. The safety edge switch of claim 7 and further comprising a groove (10) extending along each of two opposite sides of said hollow rubber profile (1).

16. The safety edge switch of claim 15 wherein said grooves (10) are formed in the external surface of said hollow rubber profile (1) and possess an undercut cross section.

17. The safety edge switch of claim 16 and further comprising a sealing strip inserted in said grooves (10) in said external surfaces and extending beyond said hollow rubber profile.

* * * * *